Nov. 18, 1947.  G. SLAYTER  2,431,205
APPARATUS FOR MANUFACTURING FIBROUS GLASS
Filed Sept. 8, 1943   3 Sheets-Sheet 2

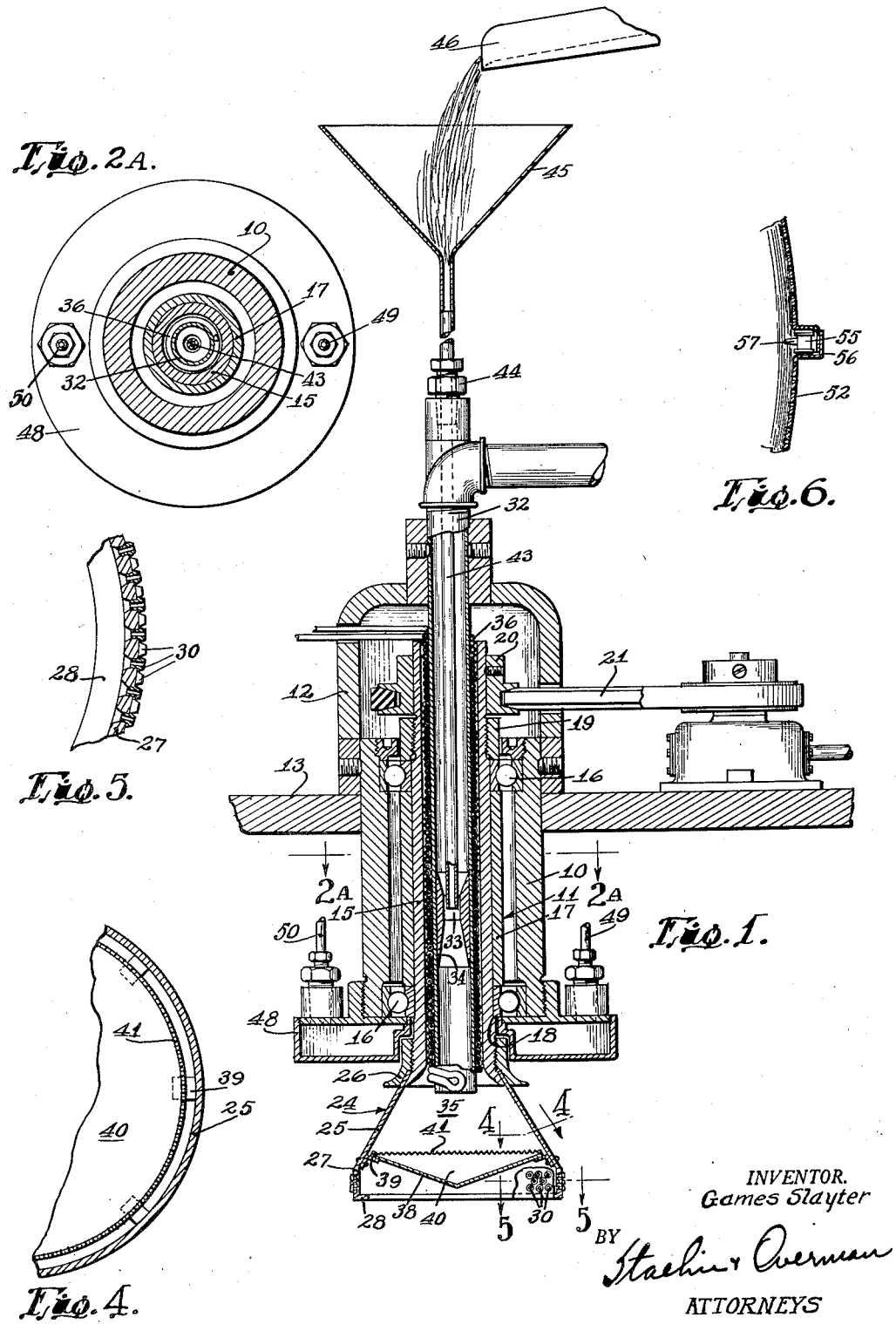

INVENTOR.
Games Slayter
BY
*Staehli & Overman*
ATTORNEYS

Nov. 18, 1947. G. SLAYTER 2,431,205
APPARATUS FOR MANUFACTURING FIBROUS GLASS
Filed Sept. 8, 1943 3 Sheets-Sheet 3
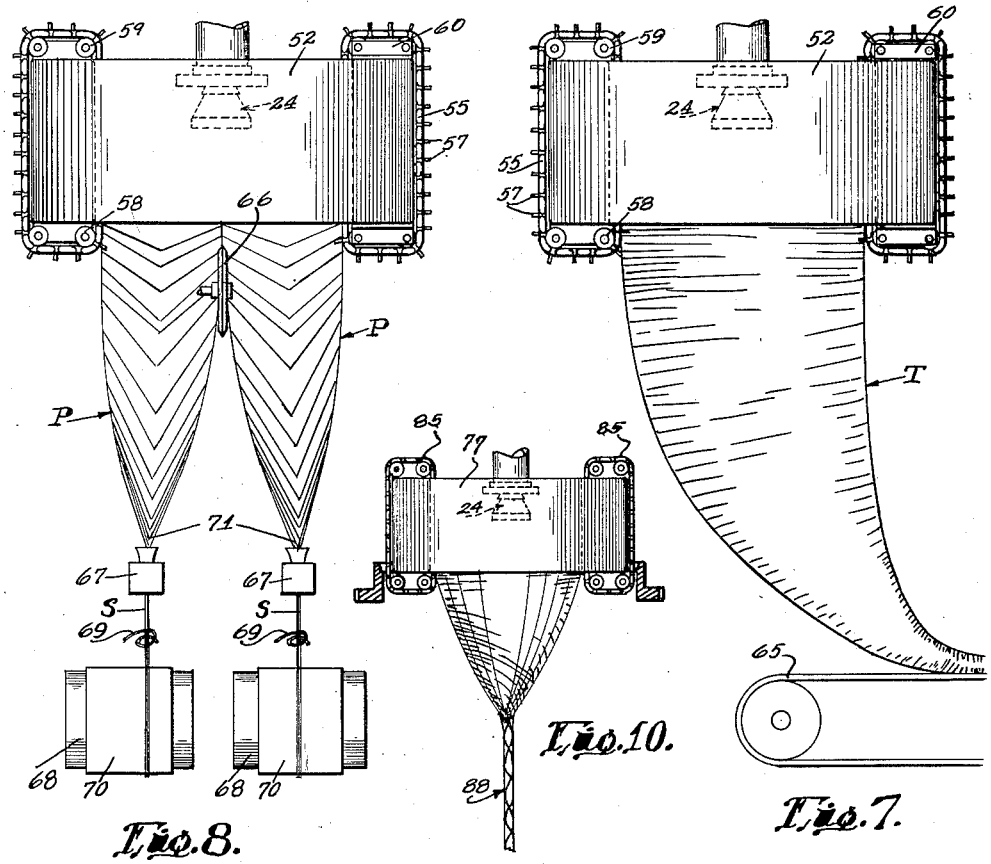
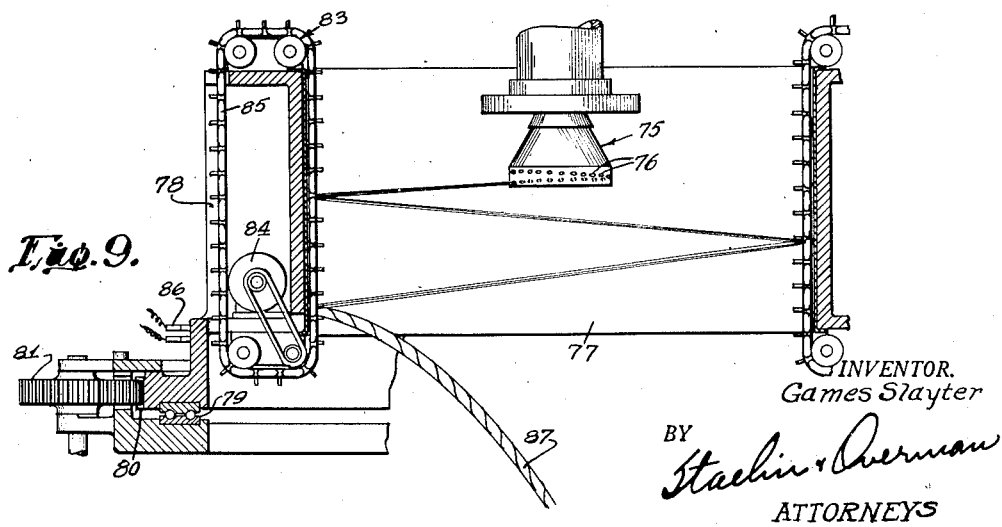

Patented Nov. 18, 1947

2,431,205

UNITED STATES PATENT OFFICE 2,431,205

APPARATUS FOR MANUFACTURING FIBROUS GLASS

Games Slayter, Newark, Ohio, assignor to Owens-Corning Fiberglas Corporation, a corporation of Delaware Application September 8, 1943, Serial No. 501,732

10 Claims. (Cl. 49—1)

1

The present invention relates to an improved apparatus for forming fine glass fibers and more particularly to apparatus for reducing glass batch material to a molten state and projecting it by centrifugal force into the atmosphere to form fibers therefrom.

Several methods of forming fibers have been suggested for utilizing centrifugal force to attenuate various materials, both organic and inorganic, in a plastic or viscous state. Some of such apparatus employed in the formation of glass fibers were adapted individually to have molten glass or batch material fed thereto and it is with this latter type of operation that the present invention is concerned.

The primary object of the invention is to produce fine glass fibers from raw finely divided batch material by apparatus capable, in a single operation, of reducing batch to a homogeneous glass and forming the glass into fibers to thereby produce fibers of a highly uniform quality.

Another object of the invention is to provide efficient heating of the raw batch for instantaneously reducing it to molten state, and to provide rapid fining of the molten glass before it is converted into fibers.

A further object of the present invention is to provide an apparatus which is simple and efficient for collecting fibers formed in the above manner.

It is a still further object of the invention to provide an apparatus whereby fibers formed by centrifugal attenuation may be collected in a manner to impart a twist thereto and thus produce a yarn in readiness for winding into a package.

Other objects and advantages will become apparent during the course of the following description and in the accompanying drawings, in which:

Figure 1 is a vertical sectional view through an apparatus embodying the principle of the invention;

Figure 2A is a horizontal sectional view taken substantially on the line 2A—2A of Figure 1;

Figure 4 is a fragmentary sectional view taken on the line 4—4 of Figure 1;

Figure 5 is a similar view taken on the line 5—5 of Figure 1;

Figure 6 is a fragmentary sectional view taken on the line 6—6 of Figure 3;

2

Figure 3:
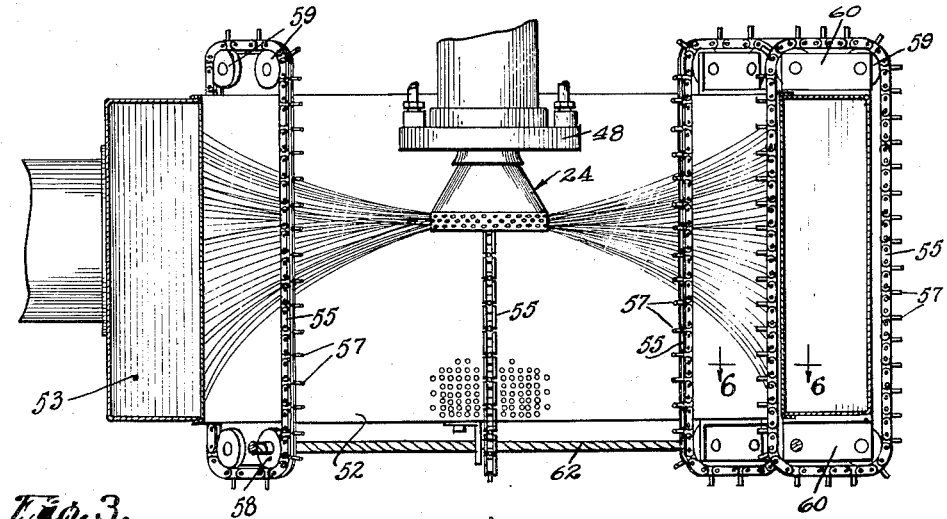
Figure 3 is a vertical sectional view through the fiber collecting apparatus.

Figure 7 is a diagrammatic view of the apparatus employed to form a tubular mat;

Figure 8 is a diagrammatic view of the apparatus as employed for forming slivers from a tubular fiber arrangement;

Figure 9 is a vertical sectional view of a modified form of the invention; and

Figure 10 is a diagrammatic view of the apparatus adapted to form a single twisted sliver.

Referring to Figure 1 of the drawings, the apparatus comprises generally a tubular sleeve 10 adapted to support a vertical spindle assembly 11 and an upper bearing frame 12 secured to the sleeve. The sleeve and frame are mounted on a plate 13 which forms a part of suitable mechanism for supporting the structure.

The spindle 11 includes a vertically arranged tube 15 mounted within the sleeve 10 and adapted to rotate in bearings 16 disposed at either end thereof. A tubular spacing member 17 surrounds the tube 15 between the bearings 16 and serves to position the tube within the sleeve. The lowermost bearing 16 is held in contact with an annular shoulder 18 formed on the tube 15 by means of a locking ring 19 threaded on the upper end of the tube and pressing against the upper bearing 16 and spacing member 17. The spindle is adapted to be rotated at the relatively high rate of speed of 5,000 to 16,000 R. P. M. thus necessitating a suitable and substantial bearing arrangement. A pulley 20 mounted on the upper end of the tube 15 within the frame 12 may be connected by means of a belt 21 to a suitable source of driving power.

A fiber forming head 24 arranged at the lower end of the tube 15 includes a side wall 25 of heat resisting sheet metal such as platinum, which flares downwardly and outwardly and is substantially conical in form and open at its lower end. The upper end of the wall 25 is secured to the tube 15 by means of a retaining ring 26 threaded on the tube 15 to clamp the wall to a flange on the end of the tube. The lower flared portion of the housing terminates in a cylindrical annular wall 27. The lower edge of the wall 27 is turned inwardly to form a stiffening flange 28, said flange further forming a retaining wall for the molten glass which is to be attenuated. A plurality of ports 30 formed in the wall 27 permit the discharge of fine streams of glass which operation will be described more in detail presently.

The introduction of molten glass into the forming head 24 is accomplished in part by means of a burner structure which includes a pipe 32 supported at its upper end by the stationary frame 12 and extending downwardly into the tube 15 and coaxial therewith. A combustible gas or gas mixture is supplied to the pipe at its upper end and is directed through a restricted orifice 33 in a burner block 34 within the pipe, into a combustion chamber 35 formed by the head 24. A water cooled coil 36 encloses the pipe 32 along its length as it passes through the tube 15 and prevents the extreme heat of the burner from affecting the spindle bearings and associated mechanism.

The open lower end of the head 24 is partially closed (Figure 1) by a circular plate 38 supported on brackets 39 which are fixed to the sloping walls of the housing. The plate is conical in form and provides a shallow well 40 in which the molten batch materials collect in a pool prior to discharge into the region of the ports 30. The rim of the plate 38 is provided with serrations 41 in the form of pointed projections, the utility of which will become apparent presently.

Batch materials in the form of finely divided particles are introduced into the burner through a pipe 43 which extends downwardly into the pipe 32 and terminates within the burner orifice 33. The pipe 43 is adjustably supported by means of a locking sleeve and nut 44. A funnel shaped guide 45 provided on the upper end of the pipe 43 is adapted to receive the batch material as it is fed in a substantially constant stream from feeder mechanism indicated at 46 and which may be a simple vibrating feeder. The rate of fibers formed by the present apparatus depends partially upon the rate at which the batch material is fed to the burner. Normally the feeding is maintained at a constant rate in order to produce a steady rate of formation of fibers. The apparatus may be said to be "self-starting" in that immediately upon introduction of batch material to the burner the batch is reduced to a molten state and ejected in fibrous form.

A water cooled shield 48 secured to the lower end of the sleeve 10 is provided with a water inlet and outlet 49 and 50 respectively so that water may be circulated therethrough. The shield partially encloses the flanged ring 26 which supports the head 24 and serves to absorb heat radiated from the head.

As the batch material is fed into the superheated atmosphere created by the burner in the combustion chamber 35 it is reduced substantially instantly to a molten state and collects in the well 40 formed in the plate 38. The centrifugal force created by the rotation of the head causes the molten glass to flow radially over the rim of the plate. The serrations 41 formed on the plate 38 divide the molten glass into a multiplicity of fine streams and these streams, upon striking the wall 25, combine with others to form a thin film. This dividing and recombining of the molten material produces a highly homogeneous glass so that fibers formed therefrom are of uniform quality. The space between the plate 38 and the wall of the housing 25 serves as an exhaust port for the burner flame so that the flame tends to keep the wall at a high working temperature. This counteracts the cooling effect of the air on the outer surface of the wall of the head due to the high speed rotation of the head. It also maintains the streams of glass flowing from the edge of the plate at very high temperature, thereby increasing the fining action.

The film of glass gathered on the wall 25 flows downwardly to the wall 27 in which the ports 30 are formed and is expelled in the form of fine streams with great force through the ports. The streams are attenuated to extremely fine filaments by the combined action of centrifugal force and the drawing action created by the movement of the ports relative to the quiescent air in engagement with the streams being attenuated. The multiplicity of ports or orifices produces a substantially continuous flow of fibers which are discharged into the atmosphere circumferentially of the spinner.

It has been discovered that attenuation may be considerably enhanced by anchoring the streams or fibers at a point removed from the forming head. The anchored stream is drawn out by a positive tensile force applied to the stream by the movement of the head relative to the point of anchorage of the stream. In this there is no limitation to the rate and especially to the degree of attenuation other than the speed of rotation of the head that may be practically obtained. On the other hand, attenuation effected by the resistance to movement of the streams due to their engagement with the relatively quiescent air about the centrifugal member, as practiced by the prior art, is limited in rate and degree by the impositive force resulting from such engagement.

The present invention provides a foraminous surface, preferably annular, surrounding the forming head in spaced relation. A movement of air through said surface is established in suitable manner to cause the streams or fibers emanating from the head to be drawn toward and held against the foraminous surface. The stream is thus anchored relative to the rotation of the forming head and movement of the head applies a positive attenuating force to the stream to draw it out to a fine fiber. The fiber as it is attenuated moves toward the foraminous surface aided by the draft of air therethrough and is deposited thereon to build up into a mat.

This apparatus (Figures 2 and 3) for holding and collecting the fibers as they are formed includes a perforated sheet metal cylindrical drum 52 disposed about the spinning head 24 and having its ends open. The drum may be suitably supported to permit handling the formed fibers as they issue from beneath. A vacuum chamber 53 enclosing the drum is adapted to partially exhaust by suitable means (not shown) the area adjacent the perforated surface which tends to draw the formed fibers thereto, anchoring the individual fibers to the perforated surface and holding the collected mass of fibers substantially in the form of a tube.

Figure 2:
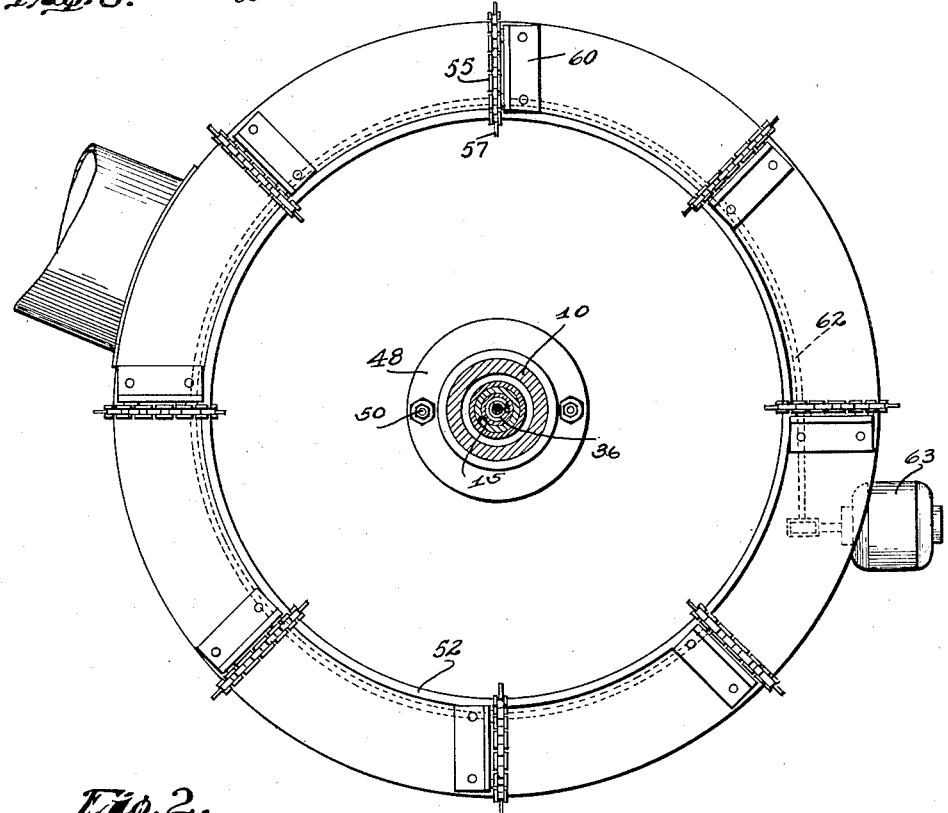
Figure 2 is a plan view of one form of fiber collecting apparatus.

Continued operation of the spinner would produce a mat of fibers in the form of a ring within the drum and in order to maintain continuous operation of the fiber forming apparatus mechanism is provided for removal of the mat at a predetermined speed. Such a means may include a series of vertically arranged chains 55 spaced circumferentially around the drum as shown in Figure 2. The inner length of each chain may be disposed within a recess 56 formed in the wall of the drum so that the face of the chain will be flush with the drum and present an unbroken surface on which the fibers are laid. Projections in the form of pins 57 are formed on the chain and provide traction means for engaging and moving the fibers as the chain is indexed. Each chain is trained over a driving sprocket 58 and idler sprockets 59 which are supported by brackets 60 mounted on the exhaust chamber 53. The driving sprockets 58 are connected for synchronous rotation by a flexible drive cable 62 which in turn is driven by a motor 63 (Figure 2) and which may be mounted on the exhaust chamber support. The chains are driven at a rate of speed which will permit a fibrous mat of predetermined thickness to be built up on the drum. Increasing the speed of the chains results in the formation of a mat of reduced thickness.

Fibers formed in the above manner are adaptable for handling in a variety of ways, one of which is illustrated in Figure 7. The tubular formation T assumed by the fibrous mat as it issues from the drum may be flattened out on a suitable conveyor 65 to form a mat of any desired thickness depending of course upon the speed at which the tube is formed. A suitable bonding or impregnating material may be added to the mat if desired. The tube also may be split and opened out to form a mat of single thickness and increased width.

Figure 8 illustrates a second method by which the tubular formation of fibers may be employed. The tube formed preferably of a relatively thin layer of fibers which it will be noted are laid substantially parallel and circumferentially of the tube, may be split by suitable means such as a slitting wheel 66 into two or more parts P. Each of the parts P may be drafted individually into a sliver S and twisted by means of a conventional twisting turbine 67 and then wound on a spool 68. A turbine of this type is shown in Patent 2,239,722, dated April 29, 1941, granted to Lannan and Vanucci. A traversing means 69 may be employed to form a package 70 of the sliver.

It will be further noted that as the mat sections P are drafted, the fibers tend to be drawn from the center so that the end portions assume a substantially parallel relation lengthwise of the sliver as indicated at 71. This tends to produce a sliver of parallel filaments in which the ends are substantially unidirectional.

The present invention may also be adapted to produce continuous fibers in strand form as shown in Figure 9. The apparatus may be modified to include a forming head 75 and associated mechanism which is similar in construction to the head 24 illustrated in Figure 1 as the preferred form of the invention. The head 75 is provided with a single row of spirally arranged orifices 76 instead of the ports 30 of the head 24. A perforated drum 77 similar to the drum 52 is supported in a frame 78 and is mounted for rotation coaxially with the head 75 on bearings 79. A ring gear 80 formed on the frame 78 is engaged by a drive gear 81 for rotating the drum.

Chain mechanism 83 is employed for moving the attenuated filaments lengthwise of the drum and may be substantially identical in number and construction with the mechanism previously described. A motor 84 for driving the chain 85 is mounted on the frame 78 and receives operating current through contact rings 86.

During operation of the head the spiral row of orifices 76 lays a series of substantially parallel continuous filaments on the surface of the drum while the drum is being rotated in a direction counter to that of the head 75. This counter rotation of the drum greatly increases the attenuating force applied to the fibers and thereby produces extremely fine filaments but the drum may remain stationary as in the previous embodiments if desired. In order to prevent succeeding turns of the head 75 from producing overlying layers of fibers, the chain mechanism is operated so that each convolution of fibers forms a helix on the drum as indicated in Figure 8. Continued operation of the chains brings the spirally arranged strand to the lower edge of the drum where it may be collected by suitable mechanism (not shown) and wound into a package. The rotating drum imparts a twist to the strand as shown at 87 which is particularly advantageous during subsequent handling and operations thereon.

The rotating drum also finds utility when employed in combination with the fiber forming head 24 for producing a fibrous mat in the tubular form previously described. A relatively thin mat of fibers (Figure 10) may be produced which can then be gathered in its entirety and drafted into a single continuous twisted sliver or roving 88, the rotation of the drum thereby producing twist in the sliver. Suitable mechanism may be provided for winding the sliver for subsequent operations.

Modifications may be resorted to within the spirit and scope of the appended claims.

I claim:

1. An apparatus for forming fine glass fibers comprising a rotary glass melting unit including a burner and provided with a combustion chamber therefor, a substantially concave plate within the chamber adapted to collect molten glass therein and discharge it in the form of fine streams, a wall enclosing said plate and spaced therefrom for collecting and combining the streams while still molten into a homogeneous film, and means forming a part of said wall for discharging said film by centrifugal force laterally of the unit to form fibers therefrom.

2. An apparatus for forming fine glass fibers comprising a rotatable melting unit, a burner within the unit, said unit having a combustion chamber in the lower end thereof, a concave plate within the chamber adapted to receive glass reduced to a molten state by the burner, said plate having a serrated edge adapted to form the glass into streams when discharged by centrifugal force, a wall enclosing said plate and spaced therefrom for collecting and combining the streams while still molten into a homogeneous film, and means forming a part of said wall for dividing the film and attenuating it to fibrous form.

3. An apparatus for forming fine glass fibers, comprising, a rotatable spinner having a combustion chamber at its lower end and open to the atmosphere thereat, a cone-shaped shield forming a well disposed within said chamber and spaced from the wall thereof, a burner within said spinner, means for feeding batch material continuously to said burner to be reduced to a molten state thereby and collected in said well, toothed projections on said shield adapted to form the molten glass into streams when discharged by centrifugal force from the well, said streams collecting and combining on the wall of said chamber to form a homogeneous film, means for rotating the spinner at a high peripheral speed, and means for dividing the film and attenuating it to fibrous form.

4. An apparatus for forming fine glass fibers comprising, a rotatable spinner having a combustion chamber at its lower end and open to the atmosphere thereat, the walls forming said chamber sloping downwardly and outwardly and terminating in a vertical wall portion, means for rotating said spinner, a cone-shaped shield forming a well disposed within said chamber and spaced from said sloping wall, a stationary burner within said spinner, means for feeding batch material continuously to said burner to be reduced to a molten state thereby and collected in said well, toothed projections on said shield adapted to form the molten glass into streams when discharged by centrifugal force from the well, said streams collecting and combining on the wall of said chamber to form a homogeneous film, and said vertical wall portion having orifices therein whereby said film is projected into streams and attenuated to fibrous form.

5. An apparatus for forming fine glass fibers comprising a hollow rotatable member having a combustion chamber at the lower end thereof, means for rotating said member, a stationary burner within said hollow member for reducing meltable materials to a molten state within the chamber, a plate within the chamber provided with a serrated edge, said edge adapted to retard in part the molten material discharged from the plate by centrifugal force caused by rotation of said hollow member, and a wall forming a part of said hollow member below the combustion chamber and provided with a plurality of ports through which streams of molten material are projected and thereby attentuated to fine fibers.

6. An apparatus for forming fine glass fibers comprising a tubular member capable of rotation at a high rate of speed, said member having its walls flared outwardly at its lower end to provide a combustion chamber, means for rotating said member, a stationary burner within the tubular member, means for feeding batch material in finely divided form to said burner to reduce it to a molten state in said chamber, a plate within said chamber and spaced from the wall thereof for collecting the molten glass, projections on said plate for dividing the glass as it is discharged from the plate by centrifugal force and deposited on said wall, and a second wall portion below said plate having orifices therein for discharging the molten material to be attenuated to fibrous form.

7. In a spinner for forming glass fibers, a rotatable forming head comprising a stationary axially disposed burner, means for feeding glass batch material to said burner to be melted thereby, primary means including a plate having a serrated edge for receiving and disseminating the molten material in string-like formation, a wall surrounding said plate and together therewith forming a combustion chamber for said burner, said wall having radially arranged orifices therein and adapted for collecting, mixing and discharging said material while in a molten state in the form of attenuated fibers, and means for rotating said forming head.

8. In a spinner for forming glass fibers, a rotatable forming head comprising a stationary burner, means for feeding glass batch material to said burner to be melted thereby, primary means including a plate having a serrated edge for receiving and discharging the molten material in a string-like formation, a wall surrounding said plate and together therewith forming a combustion chamber for said burner, said wall provided with orifices and adapted for recombining said material and attenuating fibers therefrom, and means for rotating said head.

9. In an apparatus for forming continuous glass fibers in the form of a twisted strand including a spinner providing a forming head having a combustion chamber therein, means in said spinner for reducing batch material to a molten state in said chamber, the wall of said chamber having a spirally arranged row of orifices therein adapted to produce continuous convolutions of attenuated fibers as the spinner is rotated, a rotatable drum disposed co-axially with the spinner and spaced therefrom adapted to receive fibers attenuated as a strand by the spinner, and means on said drum for independently moving the fibers collected thereon toward one end of and from the drum, whereby the rotation of said drum imparts a twist to the strand as it leaves the drum.

10. An apparatus for forming fine glass fibers comprising, a rotatable spinner including a combustion chamber at its lower end and open to the atmosphere thereat, a receptacle for molten glass disposed within said chamber and having its periphery spaced from the wall thereof, a burner within said spinner, means for feeding batch material continuously to said burner to be reduced to a molten state thereby and collected in said receptacle, the glass being discharged from said receptacle by centrifugal force and collecting and combining on the wall of said chamber to form a homogeneous film, means for rotating the spinner at a high peripheral speed, and means for dividing the film and attenuating it to fibrous form.

GAMES SLAYTER.

REFERENCES CITED

The following references are of record in the file of this patent:

UNITED STATES PATENTS

| Number | Name | Date |
| --- | --- | --- |
| 1,938,982 | Smith | Dec. 12, 1933 |
| 2,187,094 | Pink | Jan. 16, 1940 |
| 2,192,944 | Thomas | Mar. 12, 1940 |
| 2,212,448 | Modigliani | Aug. 20, 1940 |
| 2,267,019 | Esser | Dec. 23, 1941 |
| 2,338,473 | Pazsiczky | June 4, 1944 |

FOREIGN PATENTS

| Number | Country | Date |
| --- | --- | --- |
| 272,441 | Germany | Apr. 1, 1914 |
| 571,807 | Germany | Mar. 6, 1933 |
| 28,521 | Great Britain | Dec. 18, 1911 |
| 524,528 | Great Britain | Aug. 8, 1940 |
| 50,209 | France | Oct. 17, 1939 |
| 780,140 | France | Jan. 24, 1935 |
| 107,758 | Australia | June 20, 1939 |
| 377,806 | Italy | Jan. 9, 1940 |